(12) United States Patent
Stetzel

(10) Patent No.: US 6,289,837 B1
(45) Date of Patent: Sep. 18, 2001

(54) ROLLER RACK DEVICE

(75) Inventor: Eric Stetzel, Fort Wayne, IN (US)

(73) Assignee: Roller Rack Corporation, Fort Wayne, IN (US)

(*) Notice: Subject to any disclaimer, the term of this patent is extended or adjusted under 35 U.S.C. 154(b) by 0 days.

(21) Appl. No.: 09/438,940

(22) Filed: Nov. 12, 1999

(51) Int. Cl.[7] ................................................. B63B 35/40
(52) U.S. Cl. .................................... 114/259; 193/35 R
(58) Field of Search ................................ 114/258, 259, 114/343, 364, 362; 193/37, 35 R

(56) References Cited

U.S. PATENT DOCUMENTS

| | | | |
|---|---|---|---|
| 699,021 | * 4/1902 | Scharrer | 193/35 R |
| 842,156 | 1/1907 | Mathews et al. | |
| 853,620 | * 5/1907 | Barnes | 193/35 R |
| 2,172,377 | 9/1939 | Harris | 193/35 |
| 2,739,540 | 3/1956 | Woldring | 104/135 |
| 3,026,817 | 3/1962 | Sebastian et al. | 104/135 |
| 3,721,326 | 3/1973 | Bussienne | 193/35 R |
| 4,168,780 | 9/1979 | Parrott | 211/151 |
| 4,267,778 | * 5/1981 | Wilkie | 104/94 |
| 4,681,203 | * 7/1987 | Kornylak | 193/35 R |
| 5,056,642 | 10/1991 | Highsmith | 193/35 R |
| 5,249,545 | * 10/1993 | Gettman | 114/259 |
| 5,443,151 | * 8/1995 | Taylor | 198/860.1 |
| 5,476,167 | 12/1995 | Highsmith | 193/35 R |
| 5,636,587 | * 6/1997 | Klimowicz | 114/259 |
| 5,664,516 | * 9/1997 | Breeden | 114/259 |
| 6,105,746 | * 8/2000 | Faisant | 193/35 R |

* cited by examiner

*Primary Examiner*—Stephen Avila
(74) *Attorney, Agent, or Firm*—Baker & Daniels

(57) ABSTRACT

The present invention involves a conveyor component having an extruded beam which includes a base, a stem extending upwardly from the base and a hollow tube attached to the top of the stem. The hollow tube is provided with a plurality of apertures each of which are adapted to receive a wheel. An axis is secured to the walls of the hollow tube and extends through the center of the wheel for rotatably supporting the wheel. The wheels project above the hollow tube and contact an object to facilitate movement of the object. The conveyor component may be used in several applications such as mounted to the rear of a boat for supporting smaller water craft, as a conveyor system in a factory for transporting heavy objects or as a cart for transporting objects to the desired locations.

17 Claims, 3 Drawing Sheets

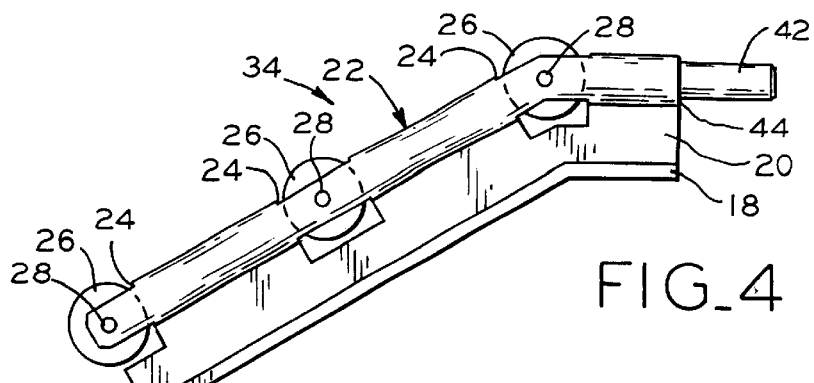
FIG_4
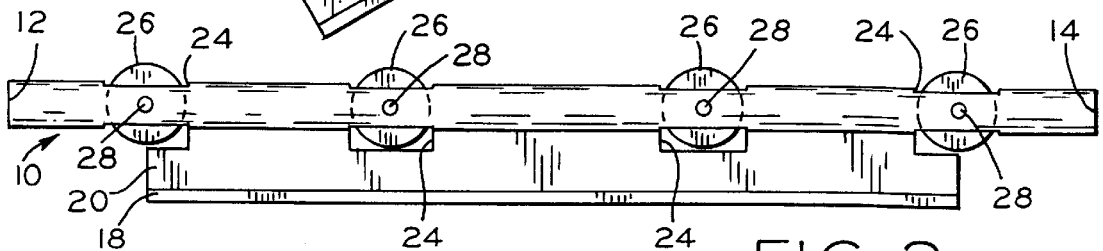
FIG_2
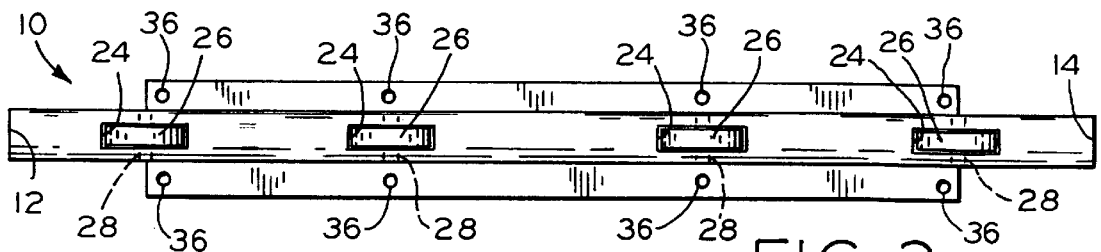
FIG_3
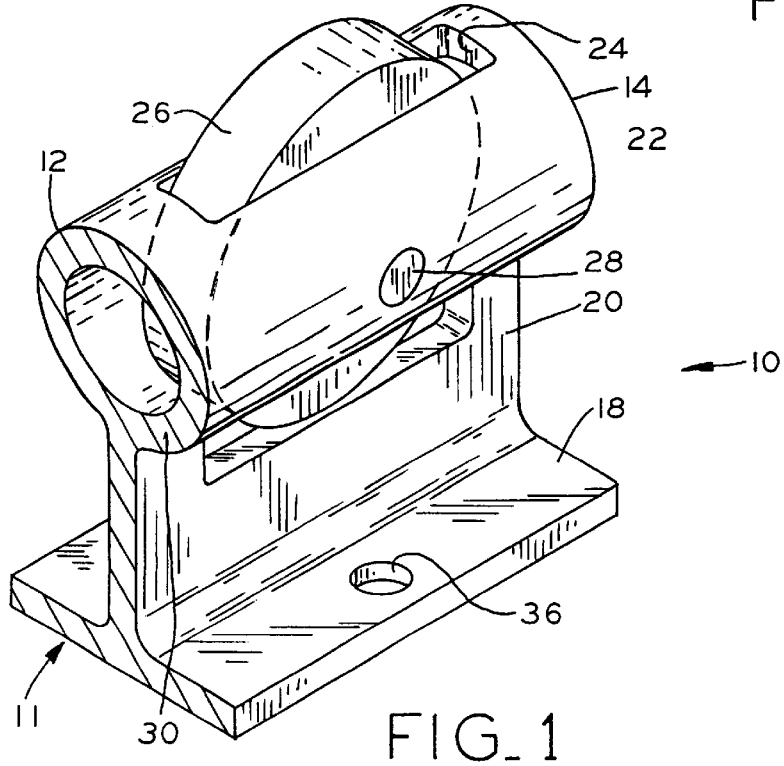
FIG_1

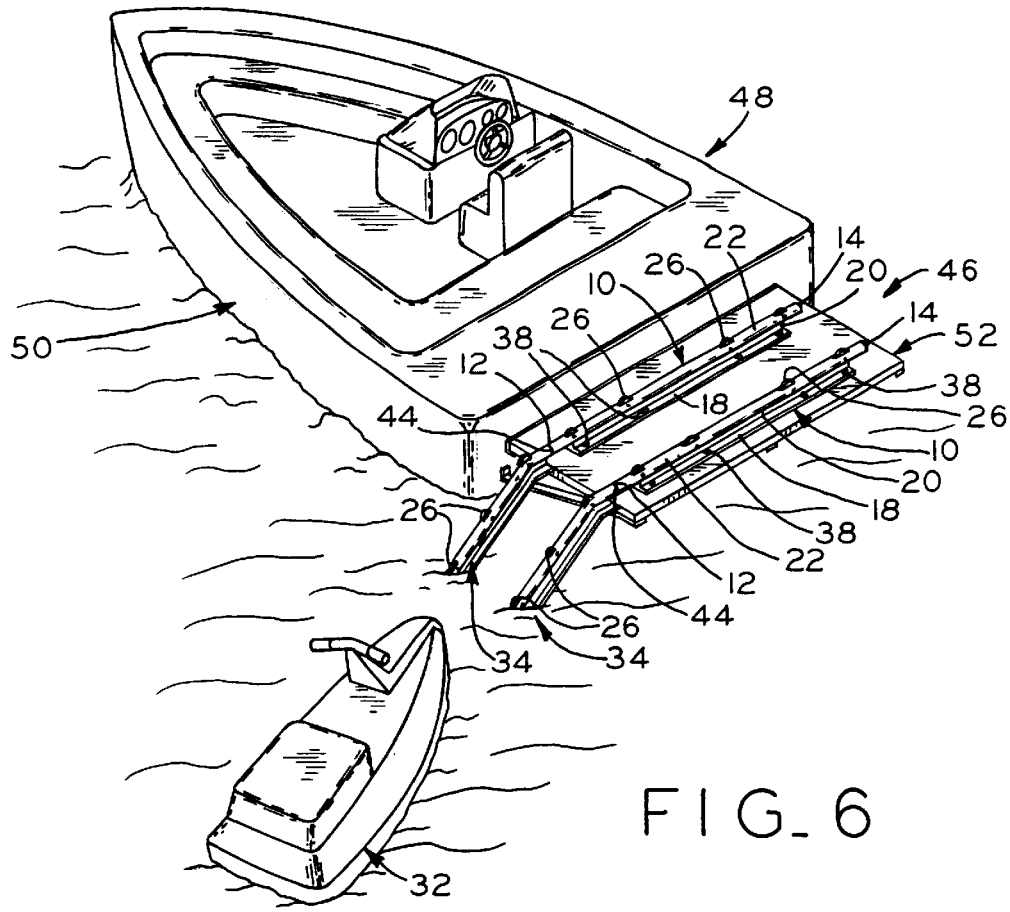
FIG_6
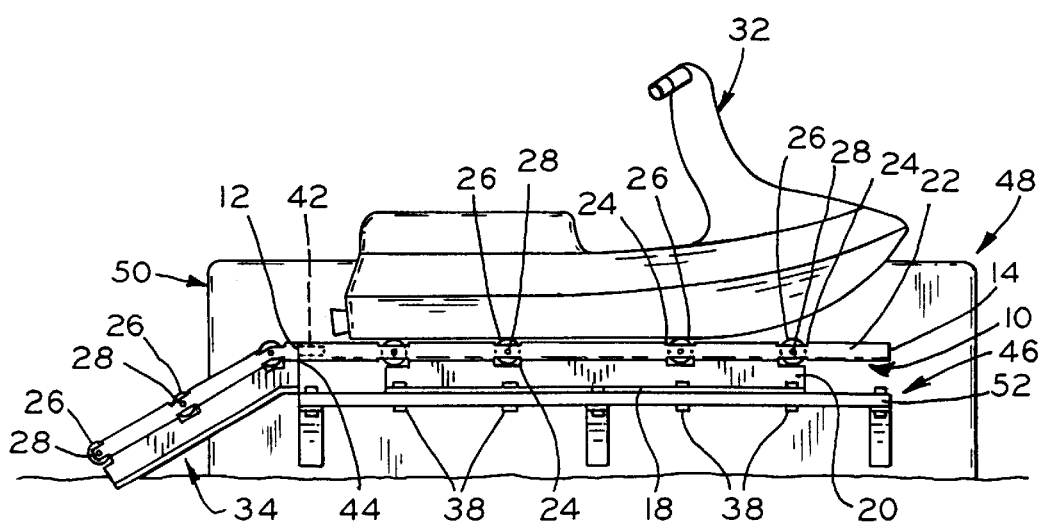
FIG_5

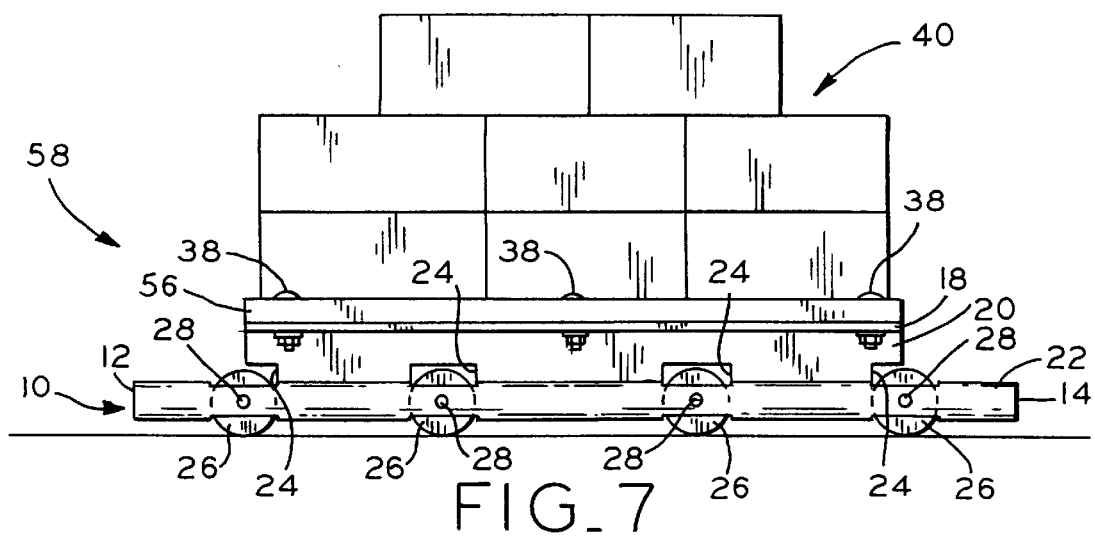
FIG_7
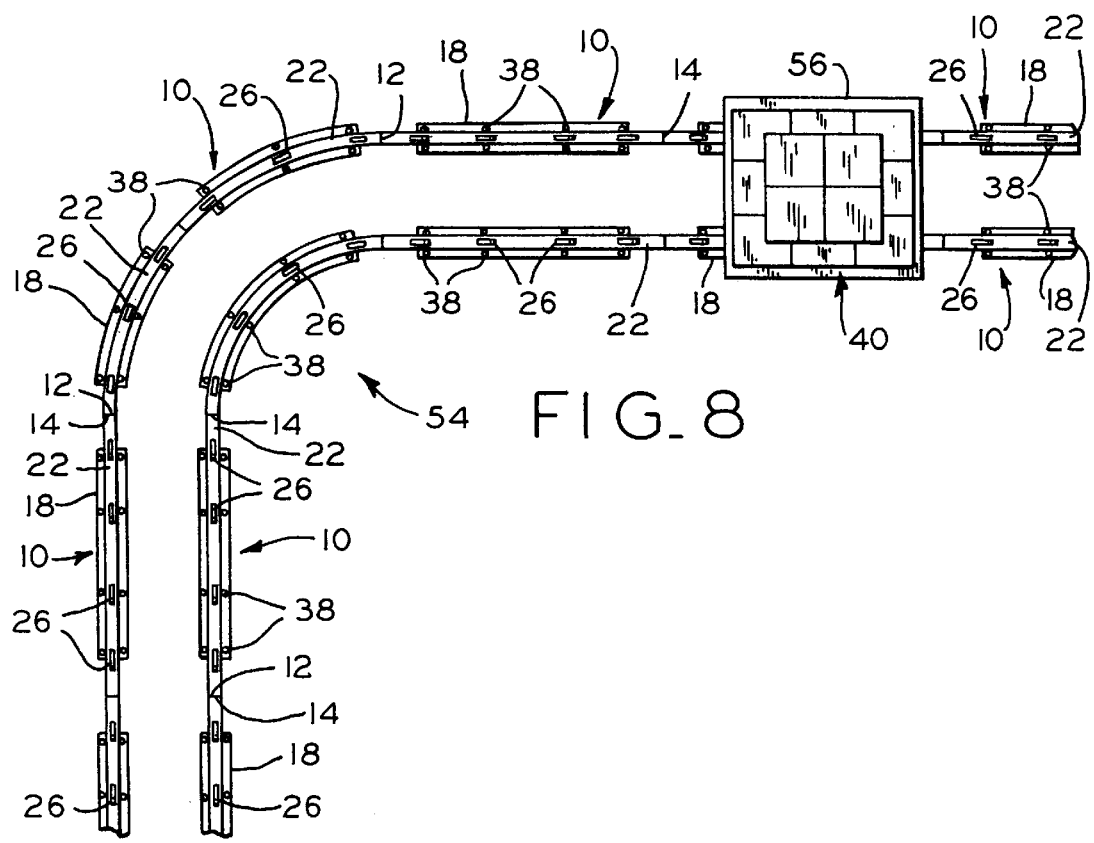
FIG_8

ROLLER RACK DEVICE

BACKGROUND OF THE INVENTION

1. Field of the Invention

The present invention relates to conveyor device for supporting and rolling an object form one location to another.

2. Description of the Related Art

Commonly, large, heavy objects must be transferred from one location to a second location, in a factory for instance. In order to accomplish the transfer, conveyor systems are installed. Conventional conveyor systems include a carrier which is the main body portion of the conveyor. The carriers of the conveyors generally manufactured by casting in an elongated form having a circular or square shape. The carrier is provided with a base which is generally a flat platform that is fastened to the carrier by bolts, screws, welding or the like. The base allows the carrier to be freestanding. The conveyor system is further provided with rollers or wheels that are rotatably attached to the carrier and extend above the carrier to contact the heavy objects. The object can then be rolled along the conveyor, transferring the object from the first location to the second location.

To accommodate such rollers, apertures formed in the carrier for the rollers and are often cast as a single aperture. The single aperture is then provided with blocks or spacers that are secured in place between the rollers after the rollers have been fastened to the carrier. The spacers protect the inside of the carrier from environmental concerns, such as collecting dirt which would impede the rotation of the rollers. The spacers also add additional parts to the assembly of the conveyor.

Problems with such conventional conveyor devices having multiple parts to assemble involve the added complexity of manufacturing the device. The manufacturing of the conventional conveyor systems is a complicated process requiring substantial amounts of time and labor. Having multiple parts also creates weakpoints in the assembly. For instance, the base portion must be attached to the carrier by fasteners, welding or the like. The point of attachment between the base and the carrier is a weakpoint in the conveyor such that if the load exceeds the maximum strength of the weld, the conveyor may fail.

What is needed is a conveyor that reduces complexity and the number of weakpoints in a multiple piece assembly.

SUMMARY OF THE INVENTION

The present invention provides a conveyor component with a unitary support beam for rollers. The unitary support beam is an extruded beam having a lower section similar to an I-beam with a flat base having a stem which is substantially perpendicular to the base. At the opposite end of the stem is a hollow tube having a plurality of slots, each of which being provided with a roller for conveying an article.

Many industries utilize conveyor components for conveying an article. The conveyor component includes a beam having a base portion, a stem extending from the base portion, and a generally hollow portion connected to the base. The hollow portion of the conveyor component includes a plurality of apertures each adapted to receive one of a plurality of wheels. The wheels include an axis that is mounted in the walls of the hollow portion and arranged to rotatably support one of the wheels.

In an exemplary embodiment, the stem of the conveyor component is located between the base and the hollow portion. The hollow portion is generally cylindrical. The wheels extend above the hollow portion and come in contact with the article being conveyed. At the ends of the beam are attachments which are adapted to attach to a second beam. The beam is a unitary extruded beam that may be made from a metal such as aluminum.

In another form, the present invention provides a support structure for a boat having a platform adapted to be connected to a boat and a pair of conveyors mounted on the platform. The conveyors include a metal beam having a base portion, a stem extending from the base portion, and a generally hollow portion connected to the base. The hollow portion is provided with a plurality of apertures each adapted to receive on of a plurality of wheels.

In an exemplary form, the wheels extend above the hollow portion which is generally cylindrical. A pair of conveyor components are aligned substantially parallel so that an article may be conveyed along the conveyor components.

In another form, the present invention provides a boat having a hull and an engine. A support structure includes a platform adapted to be connected to the boat and a pair of conveyor components mounted on the platform. The conveyor components include a metal beam having a base portion, a hollow portion and a stem located between the base and hollow portion. The hollow portion is provided with a plurality of apertures each of which being adapted to receive one of a plurality of wheels.

In an exemplary embodiment, the boat further includes a ramp attached to one end of the conveyor component to facilitate loading of an article from one plane to the platform located above the first plane. The conveyor components are aligned substantially parallel. The wheels extend above the hollow portion which is generally cylindrical.

One advantage of the conveyor component is that it is manufactured from a single beam which allows for simplicity in assembling the device. An additional advantage in reducing the number of parts required to construct the conveyor component is that the number of weakpoints in the assembly are lessened.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 1 is a perspective view of a section of the conveyor component of the present invention.

FIG. 2 is a side elevation of a linear section of the conveyor component of FIG. 1.

FIG. 3 is a top plan view of the conveyor component of FIG. 1.

FIG. 4 is a side elevation of the conveyor assembly configured to be a ramp that would attach to an additional section of the conveyor.

FIG. 5 is a side elevation of the rear of the boat shown in FIG. 6 having a conveyor component of the present invention supporting a jet ski.

FIG. 6 is a perspective view of a boat on which a conveyor component of the present invention is secured.

FIG. 7 is a side elevation of a conveyor component of FIG. 3 attached to a platform.

FIG. 8 is a top plan view of one configuration of a conveyor component of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, in several forms, and such exemplifications are not to be construed as limiting the scope of the invention in any manner.

DESCRIPTION OF THE PRESENT INVENTION

The embodiments disclosed below are not intended to be exhaustive or limit the invention to the precise forms disclosed in the following detailed description. Rather, the embodiments chosen and described so that others skilled in the art may utilize their teachings.

Referring to FIGS. 1, 2, 3 and 4, conveyor component 10 having ends 12 and 14, includes beam 16 which has a lower portion in a form similar to an I-beam. Beam 16 includes base 18 which is a flat platform for supporting beam 16 and stem 20 which extends approximately perpendicular from base 18. Attached to the opposite end of stem 20 is generally hollow or cylindrical portion 22 (FIGS. 2, 3 and 4). Base 18, stem 20 and cylindrical portion 22 are integrally formed to produce conveyor component 10 having conveyor component configuration 11 most clearly illustrated in FIG. 1.

Cylindrical portion 22 of conveyor component 10 is provided with a plurality of apertures or slots 24. As shown in FIGS. 1 and 2, slots 24 extend through cylindrical portion 22 into stem 20. Slots 24 are cut into hollow cylindrical portion 22 by methods such as milling. Conveyor component 10 is also provided with a plurality of wheels 26 that are spaced to evenly support an object such that the object does not fall between two wheels 26 and contact cylindrical portion 22, becoming lodged along conveyor components 10. Each slot 24 is adapted to receive one wheel 26, each of which includes axis 28 that is mounted in walls 30 of cylindrical portion 22 as shown in FIG. 1. Axis 28 is in the form of a bolt or pin which extends through the center of wheel 26 to rotatably support each wheel 26. Wheels 26 extend above cylindrical portion 22 of conveyor component 10 and are evenly spaced along conveyor components 10 so as to evenly support an object. Wheels 26 may then contact an article, such as water craft 32 as illustrated in FIG. 2, to roll it along conveyor components 10. Cylindrical portion 22 may be formed in shapes other than a cylinder such as square, trapezoidal, hexagonal or the like provided that it can rotatably support wheels 26.

Referring to FIGS. 2 and 3, base 18 and stem 20 extend between the centers of wheels 26 located nearest ends 12 and 14 of conveyor components 10. Conveyor component 10 has been machined or extruded in this configuration for use in the applications as shown in FIGS. 6, 7 and 8. Base 18 and stem 20 are not limited by end wheels 26 and may extend substantially the entire length of conveyor component 10. If required by the application, base 18 and stem 20 may be removed entirely from portions of beam 16. For example, ramp 34 as shown in FIG. 4 provides the same function with or without a portion of base 18 and stem 20, therefore, for purposes like reducing cost, they may be removed.

Referring to FIGS. 1 and 3, base portion 18 may be provided with apertures 36 through which fasteners 38 extend to secure conveyor components 10 in position. Apertures 36 are shown pre-drilled, however, apertures 36 may be left from the manufacturing of conveyor component 10 and apertures may be drilled to suit the application. Other methods of attachment such as clamps or the like may also be employed.

Beam 16 of conveyor components 10 requires properties such as being lightweight, easy to work with, inexpensive and strong enough to support the loads placed upon conveyor component 10. Aluminum is a material that possesses these characteristics and is suitable to support the water craft 32 and articles 40 in the configurations shown in FIGS. 6, 7 and 8. Steel, plastic or other suitable materials may be used to construct beam 16 depending on the load requirements of conveyor component 10 for the specific application. For example, in an application such as a cereal factory where lightweight boxes of cereal are transferred from one location to a second location, thermoplastic materials may be suitable for the construction of beam 16.

Beam 16 may be constructed by casting, extrusion or other methods appropriate for producing beam 16. Beam 16 of the exemplary embodiment is formed by extrusion. The stock material, in this case aluminum, is heated and pressed through a die to form beam 16 having conveyor component configuration 11. When using aluminum, extrusion is a less expensive and easier method of manufacturing elongated structures such as that of beam 16.

Referring more specifically to applications of conveyor component 10, beam 16 may be formed in a variety of shapes and sizes to convey and support object such as water craft 32 or article 40. The shapes and sized of conveyor component 10 depends on the application and the load being applied to conveyor component 10. The path of conveyor components 10 is determined by the layout of the factory for example. If article 40 must be taken from one room to the next around a corner, conveyor component 10 must be arched. The length of conveyor components 10 is generally 12 feet, however, a length suitable to the application can be manufactured. Conveyor components 10 may be linked together as shown in FIGS. 6 and 8. One end 12 or 14 of conveyor component 10 may be provided with connecter 42 such as that located on end 44 of ramp 34 (FIGS. 4 and 5). Connector 42 is slightly smaller than the inner diameter of hollow cylindrical portion 22 of conveyor component 10. This allows connector 42 to slide into either end 12 or 14 of conveyor component 10 not provided with connector 42 as shown in FIG. 5.

One assembly of conveyor component 10 is shown in FIGS. 5 and 6. Platform support structure 46 is shown attached to boat 48 having hull 50 which contains an engine. Support structure 46 includes a pair of conveyor components 10 that are secured to platform or deck 52 by fasteners 38 extending through apertures 36. Platform 52 is adapted to be connected to hull 50 of boat 48 and extends approximately perpendicularly from the rear of boat 48. Conveyor components 10 are shown in the form of linear sections (FIGS. 5 and 6). Ramp 34 extends from end 12 of conveyor 10, and although not shown, may be attached to end 14 of conveyor component 10 depending on the users needs. The pair of conveyor components 10 aligned substantially parallel to one another to create a track on which water craft 32 may be conveyed. Water craft 32 is rolled along ramp 34 to conveyor components 10 where it is supported.

An alternative assembly of conveyor component 10 includes providing tracks 54 throughout a factory for transporting articles 40 from one position in the factory to a second position. This allows for easy movement of heavy or awkward objects that are otherwise difficult to transport. Conveyor components 10 are linked using connectors 42 and secured to the factory floor. In this application, arched conveyor components 10 are used transfer article 40 in a second direction perpendicular to a first direction.

An additional use of conveyor component 10 is to invert conveyor components 10 so that wheels 26 are contacting the ground as shown in FIG. 7. Fasteners 38 then secure conveyor components 10 to platform 56 such as a piece of plywood, thereby creating cart 58. Article 40 is then movable without being limited to a specific path as with tracks 54.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A conveyor component for conveying an article, said component comprising:
    a beam having a base portion, a stem portion with a first and second end, and a generally hollow portion, said first end of said stem portion abutting said base portion and said second end of said stem portion abutting said hollow portion; and
    a plurality of wheels;
    said hollow portion including a plurality of apertures, each said apertures being adapted to receive one of said wheels, said wheels including an axis, said axis mounted in a wall of said hollow portion and arranged to rotatably support one of said wheels.

2. The conveyor component of claim 1 wherein said stem is located between said base and said hollow portion.

3. The conveyor component of claim 1 wherein said hollow portion is generally cylindrical.

4. The conveyor component of claim 1 wherein said wheels extend above said hollow portion, said wheels being in contact with the article.

5. The conveyor component of claim 1 wherein an end of said beams includes an attachment adapted to attach to a second of said beams.

6. The conveyor component of claim 1 wherein said beam is a unitary extruded beam.

7. The conveyor component of claim 6 wherein said extruded beam is constructed from metal.

8. The conveyor component of claim 7 wherein said metal is aluminum.

9. A support structure for a boat, said structure including:
    a platform adapted to be connected to a boat; and
    a pair of conveyor components mounted on said platform;
    each of said conveyor components including an extruded metal beam having a base portion, a stem portion with a first and second end, a generally hollow portion, said first end of said stem portion abutting said base portion and said second end of said stem portion abutting said hollow portion; and
    each said hollow portion includes a plurality of apertures, and a plurality of wheels, each of said wheels being disposed within one of said apertures.

10. The support structure of claim 9 wherein said wheels extend above said hollow portion.

11. The support structure of claim 9 wherein said hollow portion is generally cylindrical.

12. The conveyor assembly of claim 9 wherein said pair of said conveyor components are aligned substantially parallel, whereby an article may be conveyed on said pair of conveyor components.

13. A boat including:
    a hull and an engine; and
    a support structure comprising a platform adapted to be connected to a boat and a pair of conveyor components mounted on said platform;
    each of said conveyor components including an extruded metal beam having a base portion, a stem with a first and second end, a generally hollow portion, said first end of said stem extending from said base portion and said second end of said stem extending to said hollow portion; and
    each said hollow portion having a plurality of apertures, and a plurality of wheels, each of said wheels being disposed within one of said apertures.

14. The boat of claim 13 further comprising a ramp attached to said conveyor components to facilitate loading an article onto said support structure.

15. The boat of claim 13 wherein said pair of conveyor components are aligned substantially parallel.

16. The boat of claim 13 wherein said wheels extend above said hollow portion of said conveyor.

17. The boat of claim 13 wherein said hollow portion is generally cylindrical.

* * * * *